United States Patent [19]
Grove et al.

[11] 3,830,092
[45] Aug. 20, 1974

[54] METER PROVING APPARATUS

[75] Inventors: Marvin H. Grove; Ronald G. Dunegan, both of Houston, Tex.

[73] Assignee: M & J Valve Company, Houston, Tex.

[22] Filed: Aug. 10, 1972

[21] Appl. No.: 279,622

[52] U.S. Cl. ................................................ 73/3
[51] Int. Cl. ........................................... G01f 25/00
[58] Field of Search ........................... 73/3; 92/244

[56] References Cited
UNITED STATES PATENTS

| | | | |
|---|---|---|---|
| 3,120,118 | 2/1964 | Boyle | 73/3 |
| 3,131,611 | 5/1964 | McLaughlin | 92/244 |
| 3,295,357 | 1/1967 | Halpine et al. | 73/3 |
| 3,387,483 | 6/1968 | Van Arsdale | 73/3 |
| 3,504,523 | 4/1970 | Layhe | 73/3 |
| 3,541,837 | 11/1970 | Davis et al. | 73/3 |
| 3,678,730 | 7/1972 | Barrett, Jr. | 73/3 |
| 3,777,545 | 12/1973 | Grove et al. | 73/3 |

FOREIGN PATENTS OR APPLICATIONS

| | | | |
|---|---|---|---|
| 1,201,762 | 8/1970 | Great Britain | 73/3 |

Primary Examiner—Richard C. Queisser
Assistant Examiner—Daniel M. Yasich
Attorney, Agent, or Firm—Flehr, Hohbach, Test, Albritton & Herbert

[57] ABSTRACT

A meter prover apparatus and method making use of a metering pipe together with an interchange connecting the ends of the pipe through which spheres are transferred in connection with making meter proving runs. The interchange includes a sleeve made in two sections, one of which has a diameter slightly less than the diameter of the spheres, and the other of which is substantially larger in diameter. A piston-like plunger has a sealed fit within the larger sleeve section and power means serves to reciprocate the plunger between retracted and projected positions. When the plunger is moved to projected position it causes a sphere to be inserted into the inlet end of the smaller sleeve section, and also by displacement of liquid in the larger sleeve it causes the inserted sphere to move part way through the sleeve and a previously inserted sphere to be discharged from the sleeve. Also improved means to prevent incoming spheres from interfering with movement of the plunger to retracted position.

3 Claims, 11 Drawing Figures

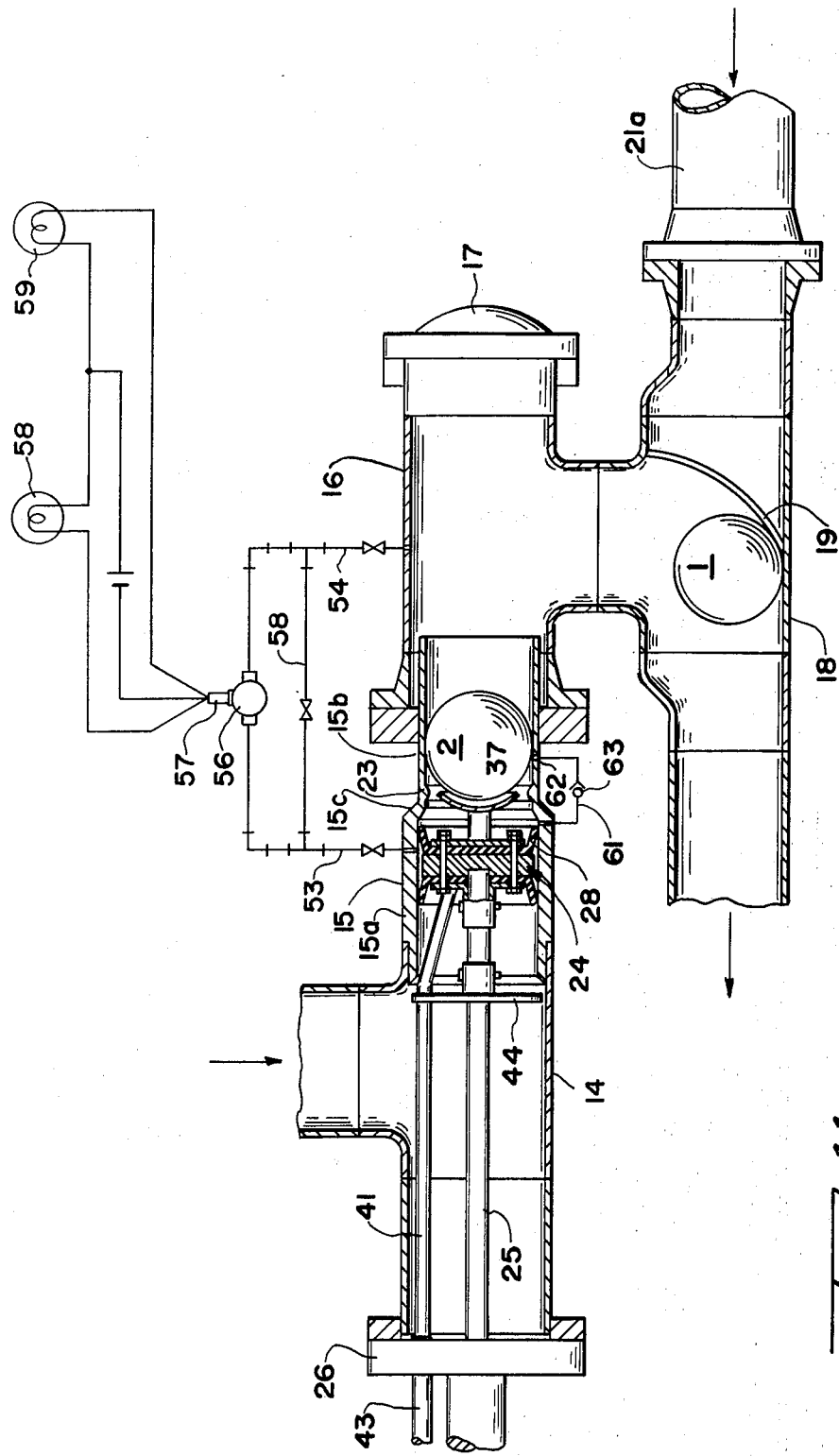

METER PROVING APPARATUS

CROSS-REFERENCE TO RELATED APPLICATION

Reference is made to application Ser. No. 183,758 filed Sept. 27, 1971 (U.S. Pat. No. 3,777,545 dated Dec. 11, 1973) and entitled "Meter Prover Apparatus and Method."

BACKGROUND OF THE INVENTION

This invention relates generally to flow meter proving apparatus and methods such as are employed in conjunction with pipeline transmission systems. Also it more generally relates to an apparatus and method for effecting controlled delivery of spheres into a liquid flow line from means forming a sphere receiving space.

In the installation and operation of pipeline transmission systems for the handling of various liquids, it is recognized that conventional flow metering devices of the positive displacement or turbine types are subject to serious inaccuracies which may be cumulative. Thus it is common to use so-called meter provers which make accurate periodic checks of the flow for calibration of the meter. One conventional form of meter prover consists of an extended length of metering pipe of uniform internal diameter and through which the main flow of the piping system can be directed. Some means is employed to enable a plug or sphere to be launched into the inlet end of the metering pipe whereby it is flow propelled through the pipe to tthe outlet end, where it is available for relaunching into the inlet end. That part of the apparatus which forms a connection between the inlet and outlet ends of the metering pipe for retrieving a sphere at the end of a metering run and for relaunching it into the inlet end of the metering pipe is commonly known as an interchange. As shown in U.S. Pat. NO. 3,387,483, the interchange may make use of valves through which the sphere passes before being launched. By means of an associated electrical system which is activated when the sphere passes through sphere detecting stations near the inlet and outlet ends of the metering pipe, a flow meter reading is obtained for the time interval which is required for the travel of the sphere between the detecting points. This reading is then compared with the known calculated volume of the metering pipe between the detecting points to provide accurate calibration data.

In an effort to simplify the interchange portion of a meter prover apparatus, it has been proposed to make use of three spheres or plugs, with two spheres being at all times within a sleeve interposed in the interchange, whereby during a meter-proving run two spheres provide the interchange seal. When it is desired to launch a sphere from a meter-proving run, a third sphere is moved by mechanical means into the sleeve, with dislodgement of one sphere for commencing the next run. This apparatus has the disadvantage that it requires a minimum of three spheres, and in addition, it relies upon seals between two spheres and the interchange sleeve to maintain a seal during a proving run. Such an arrangement is also vulnerable to accumulation of sludge solids on the uppermost sphere within the interchange sleeve, which interferes with proper movement of the sphere when launched.

Another interchange arrangement is disclosed in copending application Ser. No. 183,758, (U.S. Pat. No. 3,777,545). It makes use of a sleeve interposed in the interchange, together with a plunger which is aligned with the axis of the sleeve and is reciprocated by power means between retracted and projected positions. When projected, the plunger is within one end portion of the sleeve and provides a sealed fit which precludes possibility of leakage. Two spheres are used with this arrangement, with one sphere being within the sleeve while the other sphere is making a prover run. This arrangement has the disadvantage that when designed for relatively large pipe sizes, the interchange assembly becomes excessive in size, due largely to the relatively long stroke required for the plunger. Excessive size makes for other design and operating difficulties, such as excessive weight and space requirements.

SUMMARY OF THE INVENTION

The present invention provides an apparatus and method for effecting controlled delivery of spheres into a liquid flow line from means forming a sphere receiving space. It employs a first sleeve section having an inner cylindrical surface of a diameter slightly smaller than the diameter of the spheres, and a second connected sleeve section having a substantially larger internal diameter. A plunger is disposed in alignment with the axes of the sleeve sections, and power means is provided to reciprocate the plunger between retracted and projected positions, the plunger in projected position being in sealed interfitting relation with the second larger sleeve section. When the plunger is moved to its projected position, it causes a sphere within the second sleeve section to be inserted into the first smaller section, and it also causes a volumetric displacement of liquid from the second section through the first section to propel spheres therethrough.

In general, it is an object of the invention to provide an apparatus and method which is an improvement of the apparatus and method disclosed in the aforementioned application Ser. No. 183,758, particularly with respect to reducing the stroke of the reciprocating plunger and the manner in which the spheres are moved through the interchange.

Another object of the invention is to provide an apparatus and method of the above character which relies largely upon hydraulic liquid under pressure for controlled progression of spheres through the interchange.

Another object of the invention is to provide improved means for preventing an incoming sphere from interfering with movement of the plunger to its retracted position.

Another object of the invention is to provide a novel means and method for preventing back movement of a sphere from the sleeve during retraction of the plunger.

Additional objects and features of the invention will appear from the following description in which the preferred embodiment has been set forth in detail in conjunction with the accompanying drawing.

BRIEF DESCRIPTION OF THE DRAWING

FIG. 11 is a view like FIG. 6 but showing the plunger in fully projected position after launching a sphere.

DESCRIPTION OF THE PREFERRED EMBODIMENT

Figure 1:
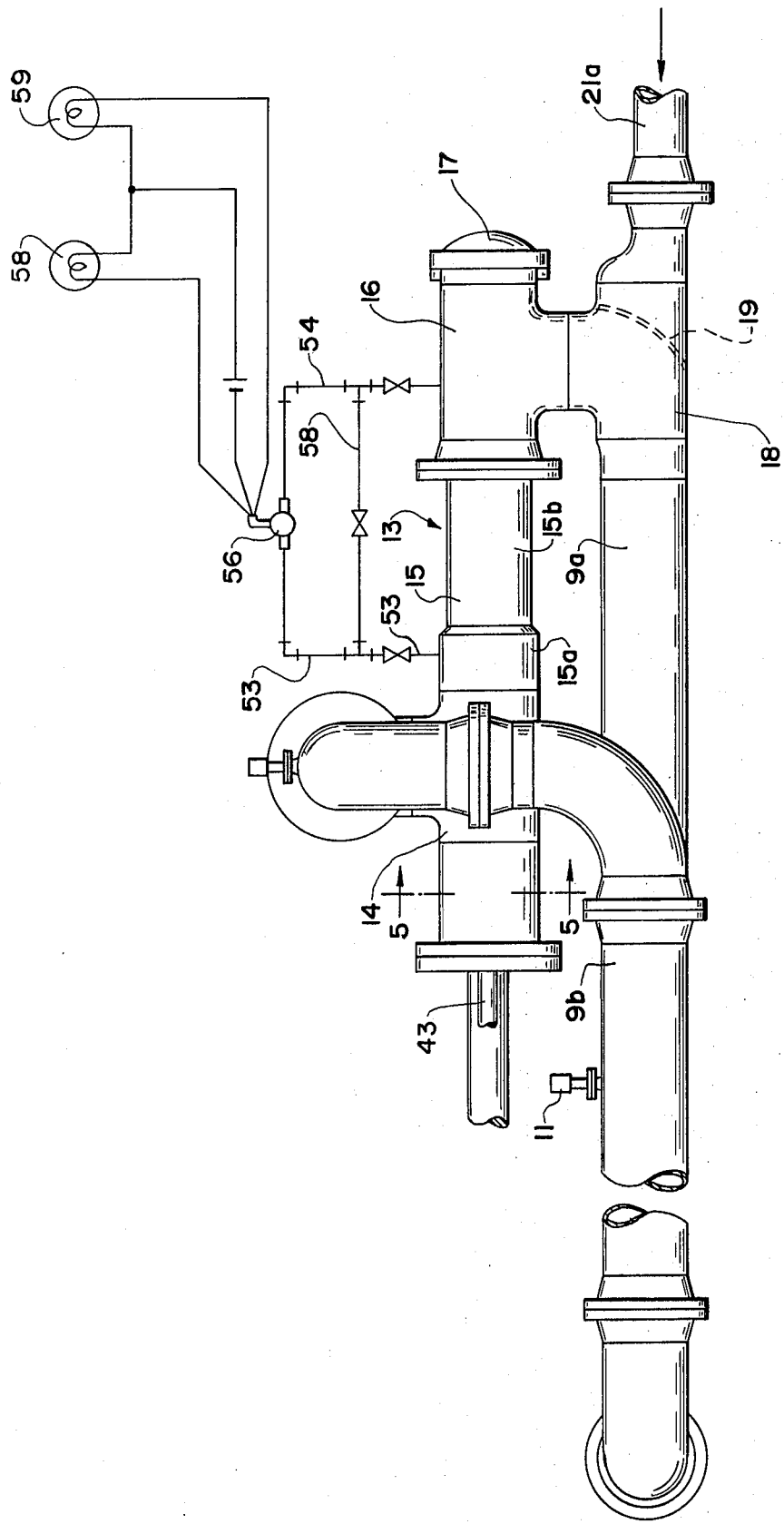
FIGS. 1, 2 and 3 are side elevation, plan and end views respectively showing a meter prover incorporating the present invention.
Figure 2:
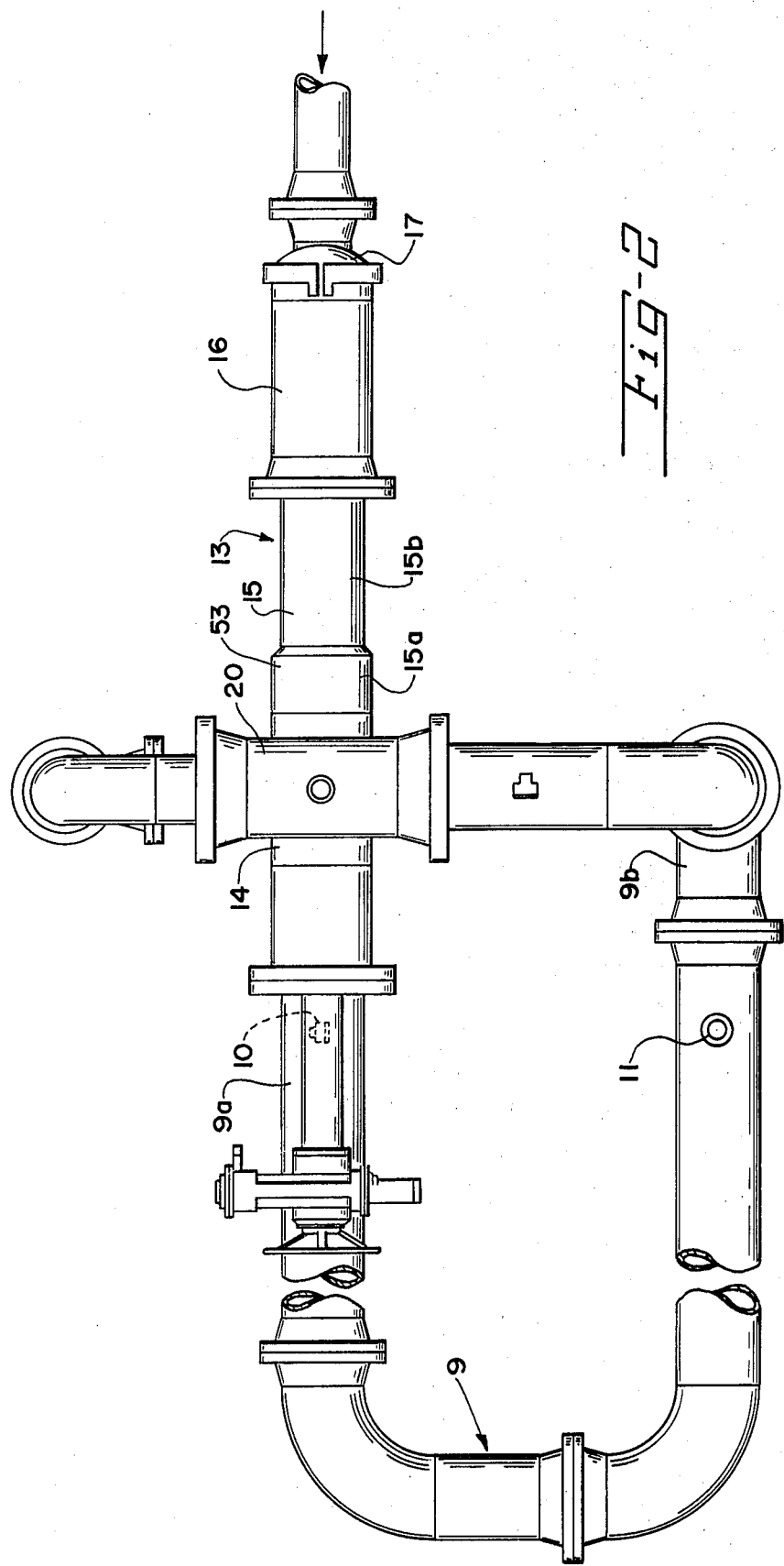

FIGS. 1 and 2 show the inlet and outlet ends 9a and 9b of a metering pipe 9. This may be an extended loop of pipe of uniform internal diameter through which the main flow of a piping system may be directed. The plug or sphere which is flow propelled through the pipe is dimensioned to have a snug fit whereby there is no leakage past the sphere. The sphere is commonly made of resilient material such as synthetic rubber and has a diameter slightly larger than the internal diameter of the metering pipe. The metering pipe 9 is provided near its inlet and outlet ends with the sphere detectors 10 and 11 which may be conventional and which, for example, may consist of an electrical switch which is operated when the sphere contacts a sensing element of the detector.

The ends of the metering pipe are interconnected by the interchange 13 which in this instance is disposed horizontally and includes tee 14, sleeve 15 and tee 16.

Figure 3:
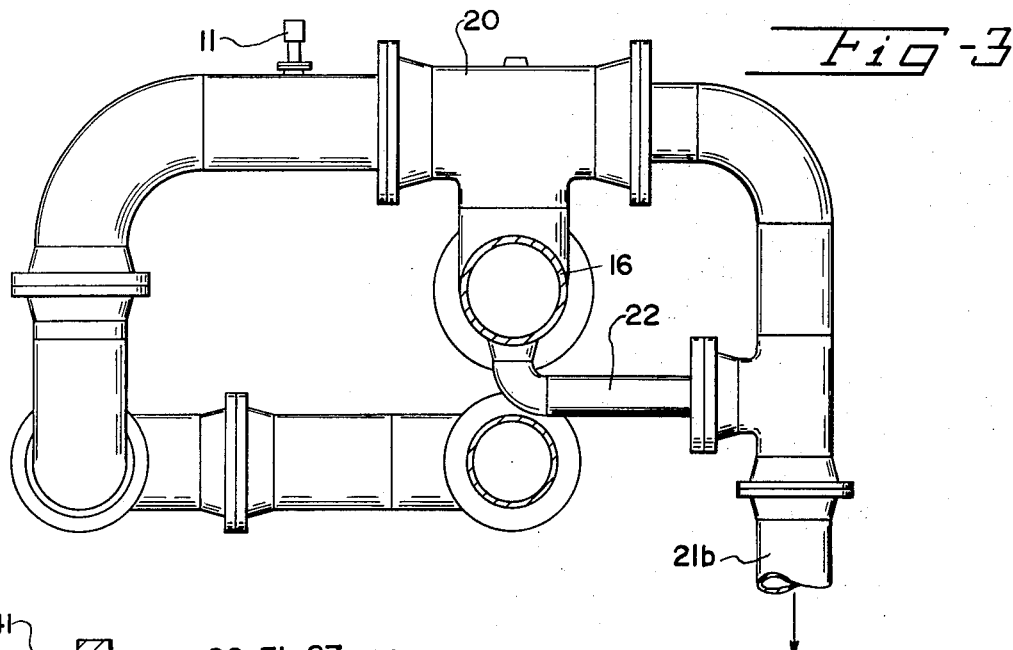

The tee 16 is shown provided with a removable access closure 17. Its lower side is shown connected with tee 18 into which line flow is discharged to enter the inlet 9a of the metering pipe 9. The barrier bars 19 in the tee 18 are sloped to direct the spheres toward the metering pipe. The tee 14, which forms the other end portion of the interchange 13, directly connects between tee 20 and one end of the sleeve 15. The other end of sleeve 15 makes direct connection with tee 16. The upstream portion 21a of the main flow line connects with tee 18 (FIG. 3), and the downstream portion 31b of the main line connects with tee 20. A bypass line 22 provides fluid communication between the line 21b and the lower side of tee 16 and prevents fluid in the interchange in front of the returning sphere from impeding movement of the sphere into the interchange.

Figure 6:
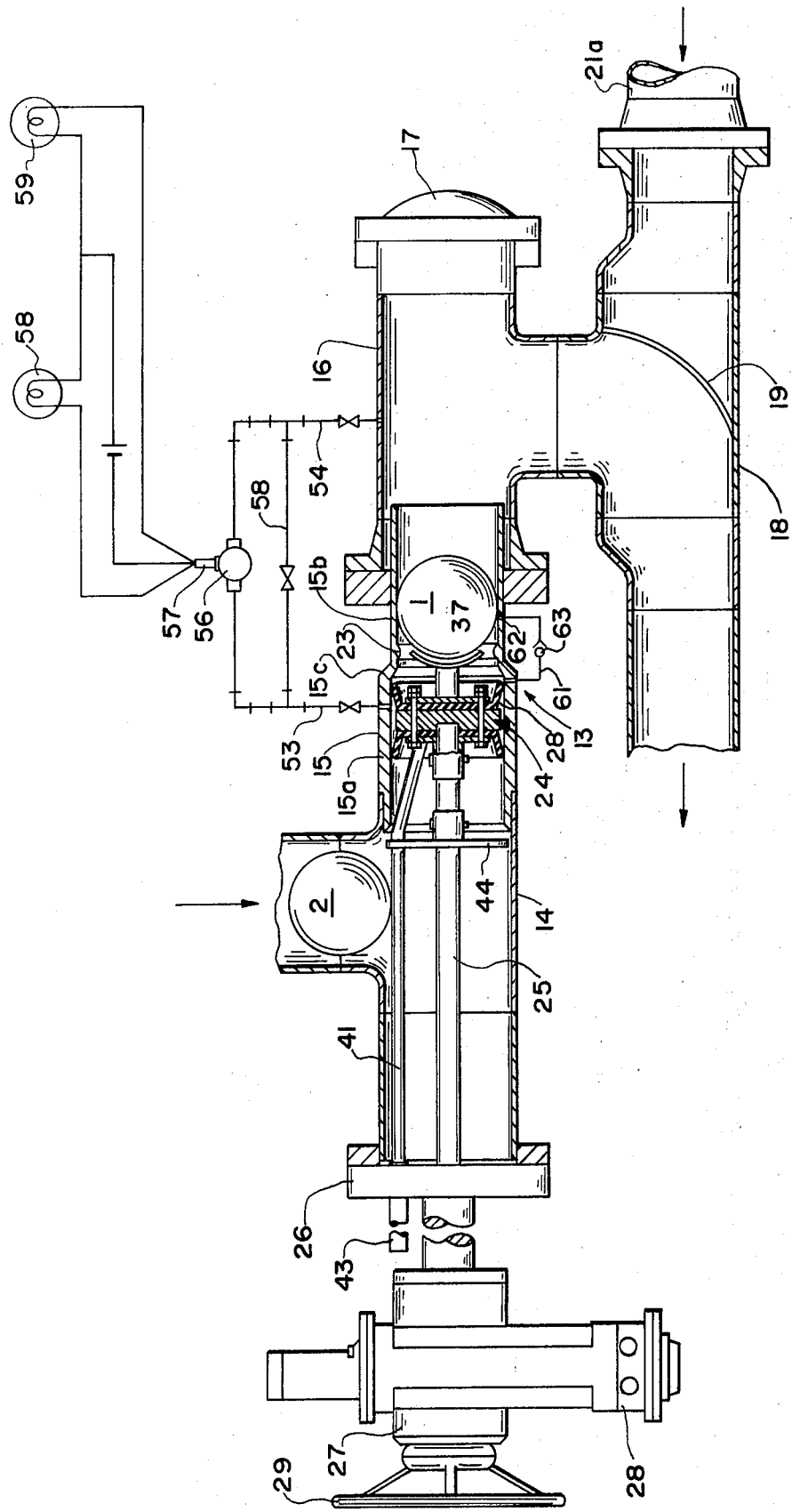
FIG. 6 is a side elevational view partly in section showing the interchange parts of the meter prover shown in FIG. 1, with the plunger in its fully projected position.
Figure 8:
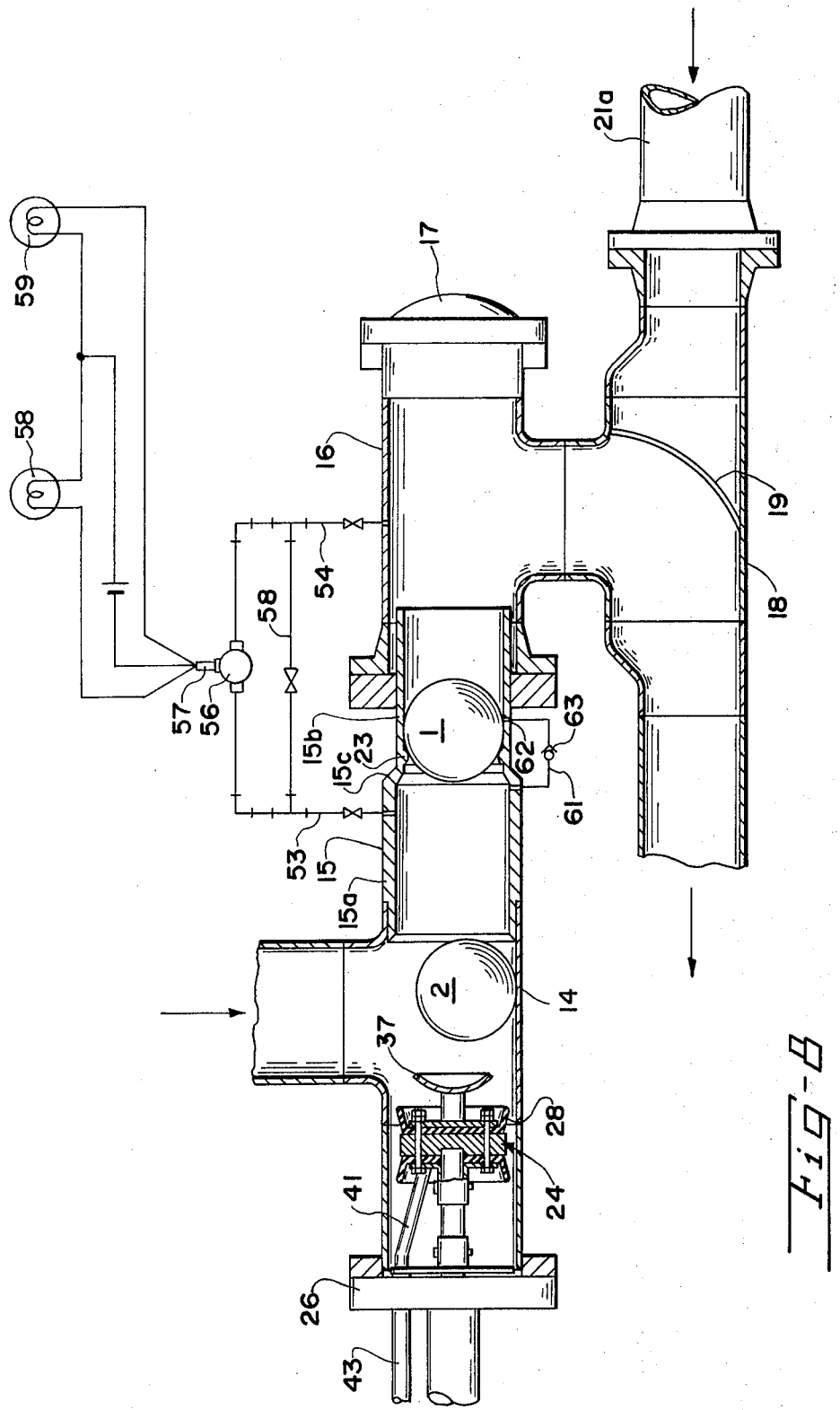
FIG. 8 is a view like FIG. 6 but showing the plunger in its fully retracted position.

The sleeve 15 (FIG. 6) is made in two sections 15a and 15b having different internal diameters. They are joined by the convergent or conical-shaped portion 15c (FIG. 6). The sleeve section 15b has an internal diameter which corresponds with the internal diameter of the metering pipe, or in other words, it is slightly smaller than the diameter of the spheres. It can be referred to as a launching tube. Preferably its one end nearest sleeve section 15a is provided with a restricted portion 23. In FIG. 6 a sphere 1 is shown within the launching tube or sleeve section 15b, and at the beginning of a meter proving run this sphere is launched by propelling it from the outlet end of section 15b. As will be presently explained, the sphere is propelled hydraulically rather than by direct physical thrust imparted by a mechanically moving part. The sleeve section 15a forms a cylinder which is adapted to receive a plunger 24 shown in its projected position in FIG. 6. As will be presently explained, the plunger is provided with means for forming sealing engagement with the inner surfaces of the sleeve section 15a. The plunger is secured to the inner end of a rod 25 which extends through the mounting plate 26, where it is provided with a suitable sealing means to prevent leakage. A power operator 27 is also carried by plate 26 and is constructed to effect reciprocation of the rod 25 by energizing the electric motor 28, or in the event of an emergency, by manually operating the hand wheel 29. The operator is preferably provided with the customary lkmiting switches whereby the plunger moves between the limiting projected position shown in FIG. 6 and the retracted position shown in FIG. 8. A suitable control panel or box with pushbutton controls (not shown) can be provided for cycling the operator.

As previously mentioned, the internal diameter of the sleeve section 15a is substantially greater than the internal diameter of the launching tube section 15b. Whereas spheres have a seal forming fit with the sleeve section 15b, they are substantially smaller in diameter than the internal diameter of sleeve section 15a. By way of example, if the internal diameter of sleeve section 15b is of the order of 8 inches, the sleeve section 15a can be of the order of 9 inches in diameter.

Figure 4:
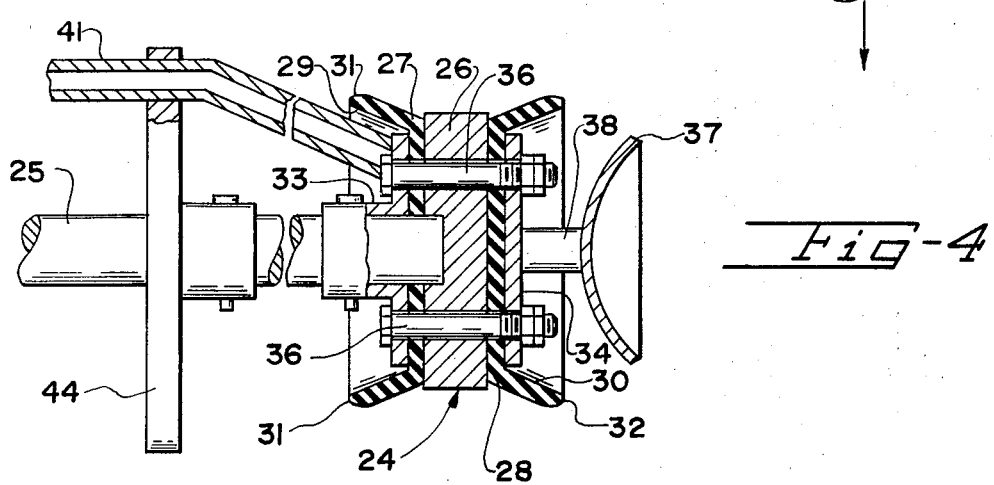
FIG. 4 is an enlarged detail in section illustrating the construction of the plunger, and also the construction of the guard means associated with the plunger.
Figure 5:
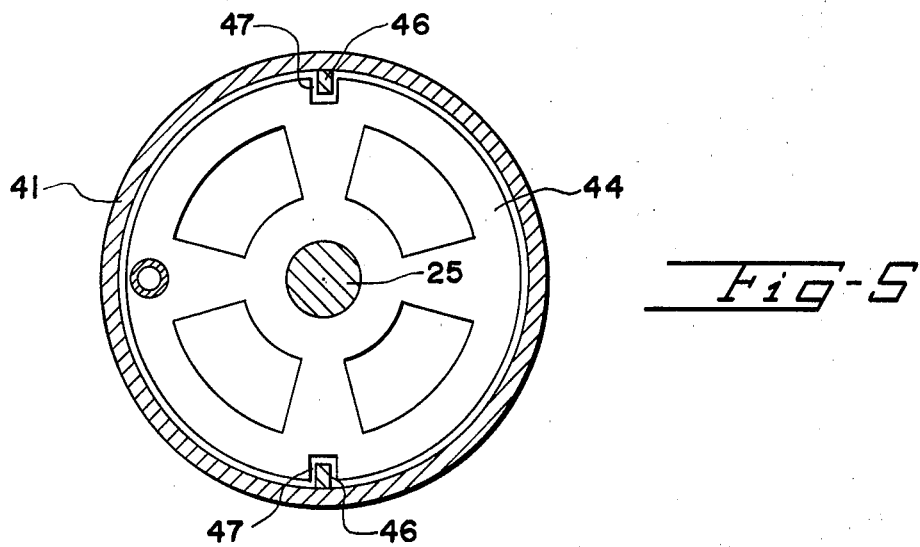
FIG. 5 is a cross-sectional view taken along the line 5 — 5 of FIG. 1, with the plunger omitted.

A suitable construction for the plunger 24 is shown in FIG. 4. In this instance rod 25 is secured to a spacer plate 26 which serves to mount the oppositely faced cup-shaped sealing members 27 and 28. These members are made of suitable resilient material such as synthetic rubber or elastomer. The rims 29 and 30 of these members when relaxed are in the form of truncated cones, and the diameter is such that when the plunger is thrust into the sleeve section 15a, the rims are contracted and flexed, and the peripheral surfaces 31 and 32 of the rims are urged into sealing engagement with the inner cylindrical surface of the sleeve section. The bases of the members 27 and 28 are shown clamped against the spacer 26 by plates 33 and 34 and bolts 36, the plate 33 being fixed to the rod 25.

Means is also carried by the plunger for applying direct mechanical thrust to a sphere. This means consists of a dished member 37 having a concave curvature comparable to that of the spheres. It is secured to a mounting stud 38, which in turn is fixed to clamping plate 34.

Means is provided in conjunction with the rod 25 to prevent an incoming sphere from taking a position which is in the path of movement of the plunger when moved toward its retracted position. This means consists of a rod or rail 41 which extends across the opening 42 into the tee 14, and which extends through the mounting plate. The end of the rail nearest the plunger is secured to rod 25 by spider 44. Beyond the spider 44 the guide rail may be bent toward the axis of the rod 25 and attached to the clamping member 33. Rotation of the guide rail 41 about the axis of rod 25 is prevented by suitable means, such as guide ribs 46 which are secured to the side walls of the tee 14, and which are loosely disposed in slots 47 provided in the circular outer edge of spider 44.

As previously mentioned, the electrical parts of the apparatus may be controlled from a suitable panel or box. The arrangement preferably is such that with the plunger in its projected position, an operating cycle is commenced by pushing an appropriate start button of the control panel to cause the plunger to be moved to retracted position, after which it returns to projected position. Also it is desirable to provide control means whereby shortly after initial movement from its projected position there is a short dwell for checking possible leakage.

Means of the type disclosed in copending application Ser. No. 362,231 filed May 21, 1973 is shown in FIG. 1 for determining whether or not any leakage is occurring either past the plunger or past the sphere in section 15b. Thus a valve controlled pipe 53 connects through a duct with the interior of the sleeve section 15a in the manner shown in FIG. 6, and this port or duct is so positioned that it communicates with the space between the sealing members of the plunger when the plunger is in its fully projected position, and with the space between the sphere 1 and the plunger when the latter is in dwell position. Another valve controlled pipe 54 communicates with the interior of tee 16, or in other words, with the outlet side of the sleeve section 15b. The two pipes 53 and 54 connect with the closed fluid chambers of a differential fluid pressure switch 56. The indicated circuitry connected to the contacts of switch 56 is extended to indicating means such as lamps 58 and 59 of different colors serving to indicate leakage in the manner to be presently described. The differential pressure switch 56 may be bypassed by the normally closed valve controlled line 58.

As disclosed in copending application Ser. No. 362,231, when the plunger of the type shown in FIG. 2 is advanced to a projected position within the sleeve section 15a, the flexing of the rims 29 and 30 as they are constricted by entering the sleeve serves to cause a drop in the pressure between the sealing members to a value substantially less than the adjacent fluid pressure. Assuming that this differential pressure is greater than a predetermined minimum value (e.g. 10 p.s.i.), the contacts of the differential pressure switch 56 are operated in such a manner as to illuminate lamp 58. If the pressure differential should decrease within a short period of time, this indicates a leakage past one or the other of the plunger sealing members, thus causing the contacts of the pressure differential switch to extinguish the indicating lamp previously energized and to illuminate lamp 59 which indicates the leak.

Figure 7:
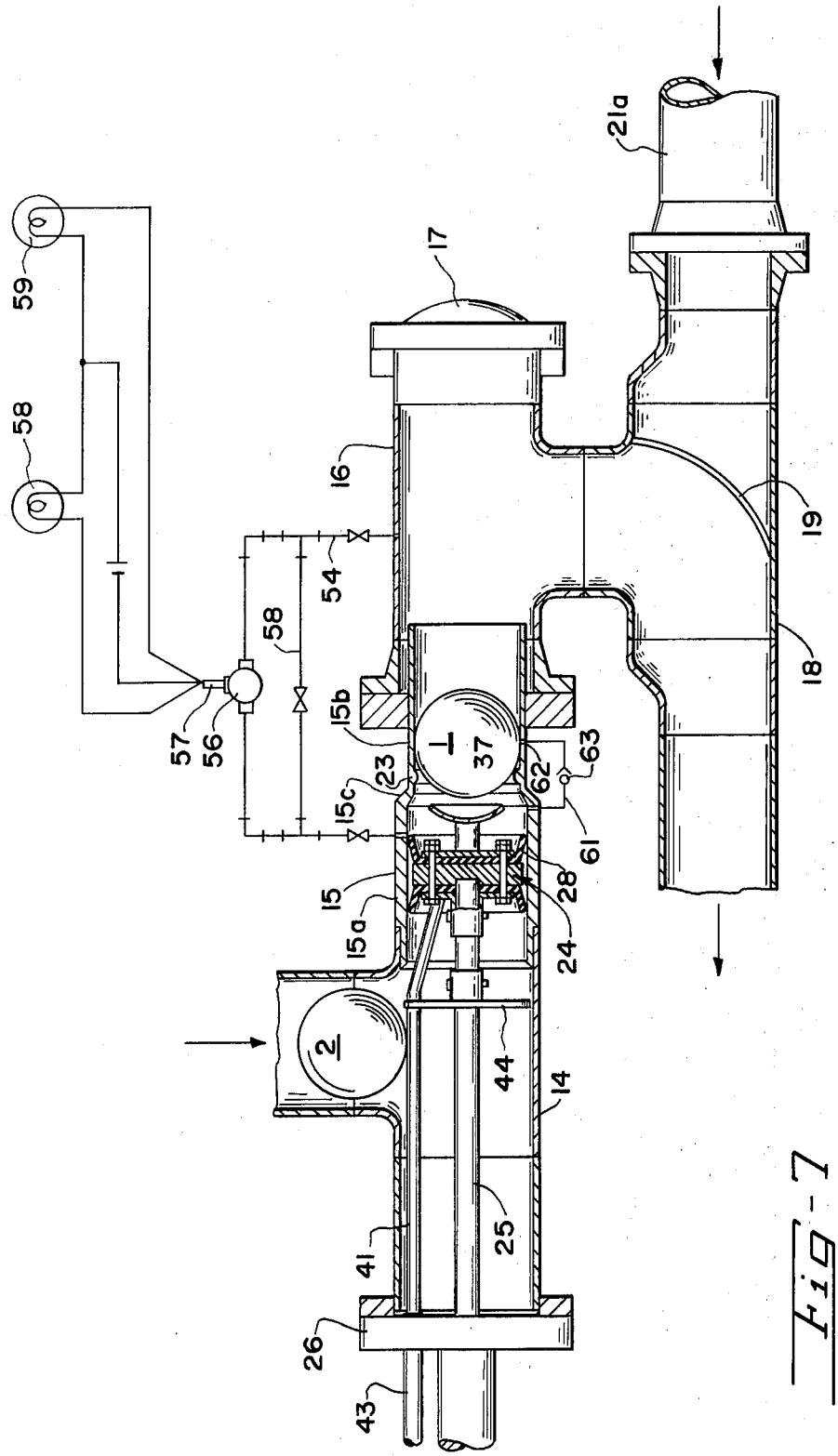
FIG. 7 is a side elevational view in section like FIG. 6, but showing the position of the plunger and other parts after initial movement of the plunger toward retracted position.

For the purpose of limiting suction action on a sphere within the sleeve section 15b, when the plunger is moved toward retracted position, a bypass line 61 (FIG. 6) connects between the interior of the larger sleeve section 15a at a point near the sleeve section 15b, and a port 62 in the side of the sleeve section 15b. For the position of the sphere 1 during the plunger dwell, shown in FIG. 7, the sphere covers and closes the port 62. A check valve 63 is provided in line 61 whereby flow can occur only from the sleeve section 15b.

Operation of the apparatus described above and the method involved are as follows. It is assumed that before commencing a cycle of operation the plunger is in the fully projected position shown in FIG. 6. At that time the plunger forms a seal between the ends of the sleeve, and the sphere 1 is disposed within the smaller sleeve section of launching tube 15b ready to be launched in the next cycle of operation. Also the sphere 2 previously cycled is shown adjacent the guard rail 41. Flow of liquid is being diverted from an associated pipe line provided with a flow meter, into the pipe 21a, and is discharging through pipe 21b. The operator indicates a cycle of operation by depressing a start button of the control panel, and this serves to energize the motor 28 of the valve operator 27, thus starting retraction of the plunger. As the plunger first starts to retract, it initially applies suction to and draws with it the sphere 1 until the plunger and sphere reach the dwell position shown in FIG. 7. Preferably the plunger is held in this dwell position for a short time (e.g. 20 - 30 seconds) to check for possible leakage past the sphere. The initial plunger movement serves to lower the pressure in the space between sphere 1 and the plunger, which is indicated by switch 56 and the circuitry controlled by the same. Maintenance of such pressure difference during the dwell time shows the absence of such leakage.

Figure 9:
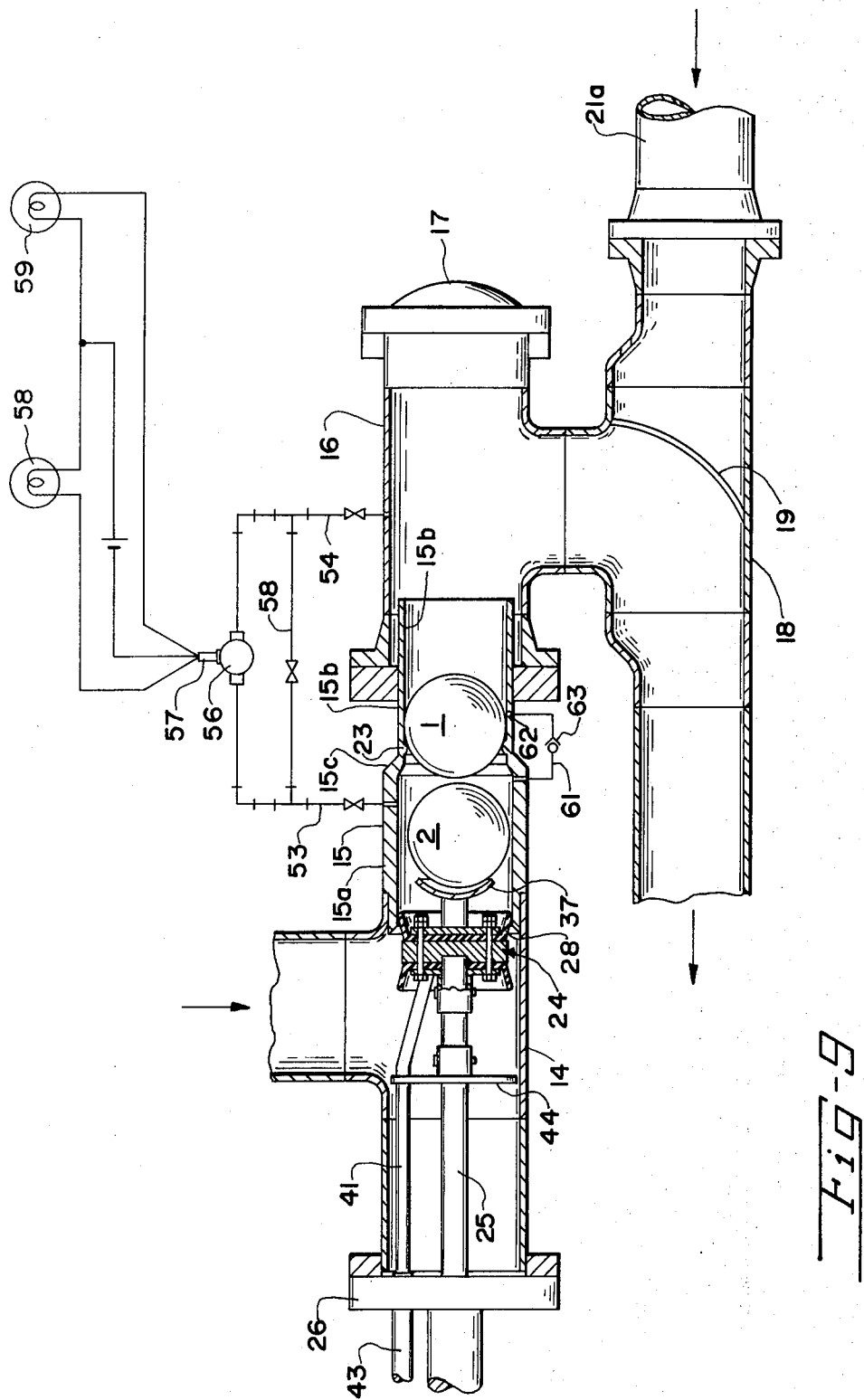
FIG. 9 is a view like FIG. 6 but showing the plunger in a position where it is entering the sleeve section of larger diameter, preparatory to discharging the sphere from the sleeve section of smaller diameter.

Continued movement of the plunger after the dwell moves sphere 1 by suction to a position (FIG. 8) adjacent or in engagement with the restriction where it no longer closes port 62. As a result, flow through the line 61 and check valve 63 releases further suction on sphere 1, and thus the sphere remains in contact with or adjacent the restriction 22. The plunger travel continues toward retracted position and eventually reaches the position shown in FIG. 8. When in this fully retracted position, the sphere 2 is free to move into general alignment with sleeve section 15a. After being moved to its retracted position shown in FIG. 8, the plunger moves back toward its projected position. During this movement the sealing member 28 of the plunger enters the sleeve section 15a as shown in FIG. 9 and thereafter displaces liquid into section 15b to move sphere 1. As shown in FIG. 9 the sphere 2 is in a position within the sleeve section 15a adjacent to but spaced from sphere 1. Sphere 2 has been caused to assume this position because of the mechanical action of member 37. The plunger continues to move from the position of FIG. 9 to the towards its fully position shown in FIG. 10. The member 37 has mechanically forced the sphere 2 into section 15b and past the restriction 22. In addition, displaced hydraulic liquid has caused sphere 1 to be moved a further distance toward the discharge end of the sleeve section 15b.

Further movement of the plunger to the fully projected position of FIG. 11 serves to launch the sphere. During movement between the positions shown in FIGS. 10 and 11, the plunger continues to displace liquid, and this volumetric displacement is sufficient to transpose sphere 2 to the position shown in FIG. 11.

Figure 10:
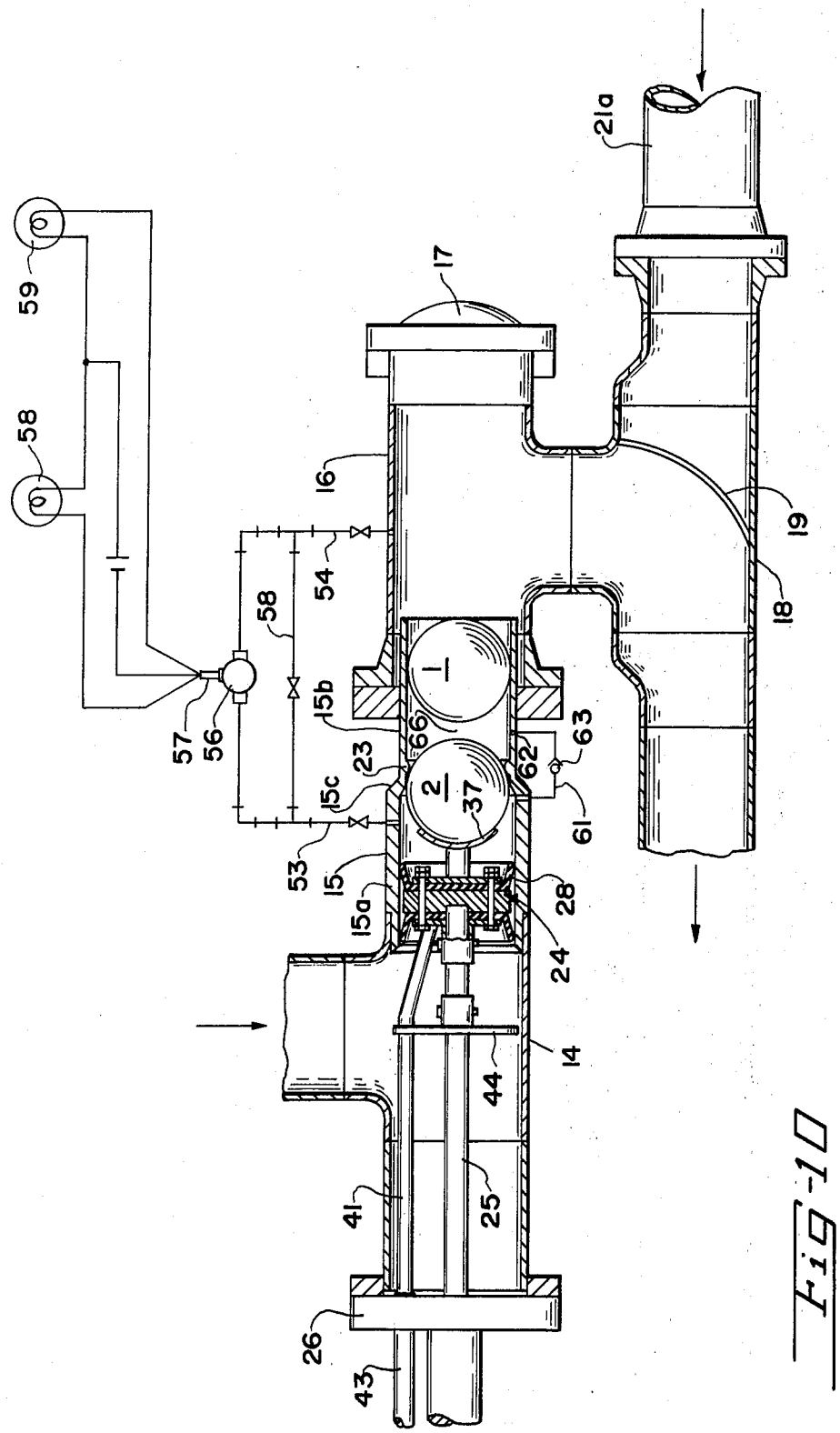
FIG. 10 is a view like FIG. 6 but showing the plunger acting on a sphere to force it into the smaller sleeve section.

By reference to FIG. 10 it will be seen that the two spheres 1 and 2 are maintained separated by the space 66 as they move between the positions shown in FIG. 10 to the launching of sphere 1 and the repositioning of sphere 2 as shown in FIG. 11. Likewise, except for some initial thrust which may be applied to sphere 2 by member 37 as it initially enters the section 15b, the two spheres move totally under the urge of hydraulic pressure. Because section 15a is greater in internal diameter, the volumetric displacement is such that for the relatively short stroke of the plunger within the sleeve, one sphere is moved a sufficient distance for launching.

Further movement of the plunger is arrested after it reaches the fully projected position of FIG. 11. The launched sphere 1 is now flow propelled into the metering pipe, and eventually is returned to the position shown in dotted lines in FIG. 1. During a metering run the differential pressure switch can be relied upon to detect any leakage past the plunger, since at that time pipe 53 communicates with the space between the sealing members 27 and 28.

We claim:

1. In meter proving apparatus, enclosing means forming a first sphere receiving space, a metering pipe having its outlet end in communication with said space to deliver spheres therein, a launching tube, a sleeve section connected to an inlet end of the launching tube and open to said first sphere receiving space, said launching tube having an inner cylindrical surface of a diameter slightly smaller than the diameter of the spheres whereby a sphere within the launching tube has a seal forming fit with the same, a plunger for forcing a sphere from said first sphere receiving space into the inlet end of the launching tube and for hydraulically discharging a previously inserted sphere from the outlet end of the launching tube, the plunger being aligned with the axis of the launching tube, said plunger having a sealing portion and a rod portion, means for reciprocating the plunger, a sleeve section connected to the inlet end of the launching tube and open to the first sphere receiving space in the enclosing means, the sleeve section having an inner cylindrical surface of a diameter substantially greater than the inner diameter of the launching tube, means for moving the plunger between a retracted position removed from the sleeve section to a projected position within the same, and means forming a seal between the sealing portion of the plunger and a portion of the inner cylindrical surface of the sleeve section, the plunger rod portion being of selected length so that when moved from its retracted toward its projected position within the sleeve section, said plunger rod portion causes a sphere within the first sphere receiving space to be inserted into the sleeve and from thence into the inlet end of the launching tube and thereafter to effect volumetric displacement of liquid from the sleeve section to hydraulically urge said sphere into the launching tube and to cause a previously inserted sphere in the launching tube to be discharged therefrom as the plunger is moved to its fully projected position.

2. Apparatus as in claim 1 together with means forming a bypass connected between the sleeve section and the launching tube, said bypass including a check valve serving to permit flow of liquid therethrough from the launching tube into the sleeve section but preventing flow in an opposite direction, one end of the bypass communicating with the launching tube at a point spaced from the inlet end of the same and the other end communicating with the interior of the sleeve at a point near the adjacent end of the launching tube, said bypass serving to relieve suction upon a sphere in the launching tube when the plunger is moved toward retracted position and after the sphere has been moved by suction to a position near its inlet end.

3. Apparatus as in claim 1 together with guard means to prevent movement of a sphere into a position to interfere with retraction movement of the plunger when the plunger is in its projected position, said guard means including a guard rail movable together with the plunger, said guard rail extending in a position to block movement of a sphere into said first sphere receiving space when the plunger is within said sleeve.

* * * * *